FRANZ WERNER INVENTOR.

BY

AGENT

INVENTOR.
FRANZ WERNER

BY

AGENT

United States Patent Office 3,508,695
Patented Apr. 28, 1970

3,508,695
GUIDE STRUCTURE FOR RECORD CARRYING DRUM

Franz Werner, Vienna, Austria, assignor to U.S. Philips Corporation, New York, N.Y., a corporation of Delaware Filed Jan. 9, 1968, Ser. No. 696,635
Claims priority, application Austria, Jan. 25, 1967, A 708/67
Int. Cl. B65h 23/02
U.S. Cl. 226—196 5 Claims

ABSTRACT OF THE DISCLOSURE

A drum for supporting a record carrier used in a recording and/or playback apparatus. The drum is partially surrounded by an envelope and has guide elements projecting from the drum periphery toward the envelope for supporting the record carrier in a helical path around the drum.

This invention relates to a recording and/or playback apparatus, particularly for signals having a broad frequency spectrum, wherein a record carrier has to be laid helically over part of the periphery of a drum projecting from the chassis of the apparatus. Guide elements such as pins and the like, project from the periphery of the drum, for guiding the record carrier over the periphery on at least the side of its path facing the chassis of the apparatus. In such apparatus the difficulty arises in positioning the record carrier around the drum. In fact, when the record carrier has been laid on one side on the guide elements the carrier usually slides off the guide elements before having reached the other side of the drum. Furthermore, after the record carrier has been laid around the periphery of the drum, it must be continuously held under tension for close contact with the periphery of the drum. If the tension unduly slackens the loose record carrier may slide off the above-mentioned guide elements.

An object of the invention is to obviate these difficulties and this is achieved by closely surrounding the drum with an annular envelope. Guide elements are provided on the periphery of the drum and extend toward the envelope on the side of the path of the record carrier nearest to the chassis. The ends of the guide elements project from the periphery of the drum to at least the plane in which the inner surface of the envelope is situated; the envelope having at least one slot which extends in the direction of the axis of the drum and through which the record carrier may be fed towards or away from the drum. The engagement of the record carrier around the periphery of the drum, is performed by lowering the record carrier into the free space between drum and envelope. Since the guide elements which are provided on the side of the path of the record carrier facing the chassis of the apparatus bound the free space towards the chassis of the apparatus, the record carrier cannot reach beyond these guide elements and as a result assumes its prescribed position around the drum. After the record carrier has been placed in position in this manner, it can be tensioned. If said tension should occasionally decrease, the record carrier cannot leave its prescribed position under any circumstances.

The envelope and a cover plate of the apparatus are advantageously combined into one structural part. A very efficacious construction is obtained if the cover plate has a cylindrical portion surrounding the drum and pointing towards the free end thereof, and the free end of said cylindrical portion has a U-shaped, likewise cylindrical extension which extends to the guide elements.

The insertion of the record carrier into the free space between drum and envelope is advantageously simplified by giving the envelope a funnel-like shape at least at its end remote from the chassis of the apparatus.

In apparatus in which the record carrier is fed over the periphery of the drum with guide elements on each side of its path, an advantageous embodiment has the guide elements which are arranged on the side of the path of the record carrier remote from the chassis of the apparatus project from the periphery of the drum a short distance than those which are arranged on the side adjacent the chassis of the apparatus, the first-mentioned guide elements having oblique sliding surfaces on the side remote from the path of the record carrier, pointing towards the free end of the drum.

In order that the invention may be readily carried into effect it will now be described in detail, by way of example, with reference to the accompanying diagrammatic drawings in which.

Figure 1:
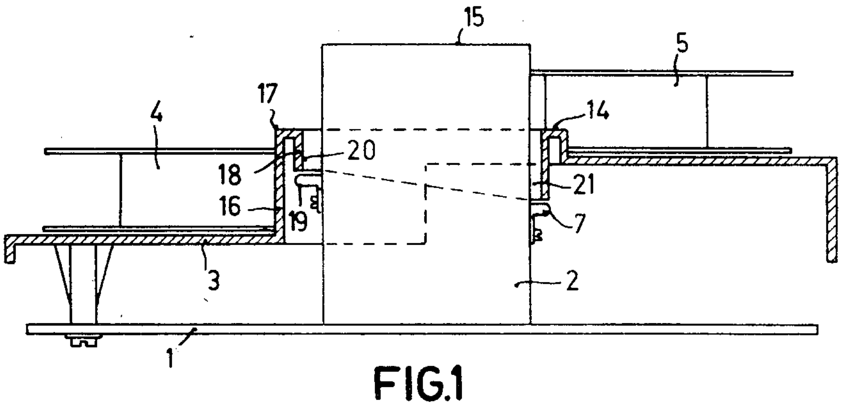
FIGURE 1 is a part sectional view.
Figure 2:
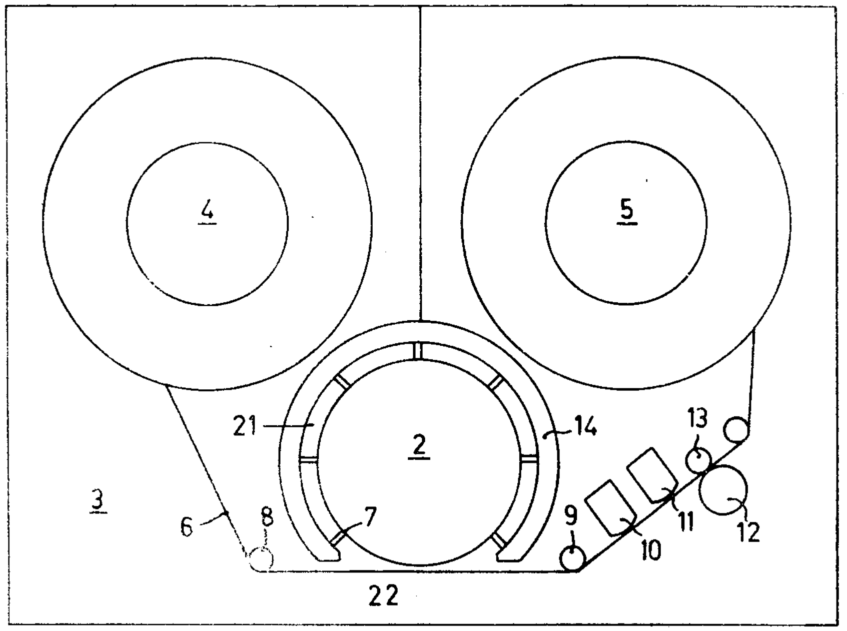
FIGURE 2 is a plan view of an apparatus in which an envelope and a cover plate of the apparatus are combined into one structural part and in which the record carrier is laid around the drum in a helical path.

In FIGURE 1, the chassis of an apparatus which is indicated by 1, supports a drum 2 which protrudes through a cover plate 3 of the apparatus. Reel discs including reels for the record carrier are situated above the cover plate. A supply reel 4 is arranged at a lower level than a take up reel 5 so that, together with a slightly oblique position of the drum, a record carrier 6 can be laid around the drum in a helical path. For guiding the record carrier along the periphery of the drum hook-shaped guide elements 7 projecting from the periphery of the drum are provided on the side of its helical path facing the chassis of the apparatus. Two pins 8 and 9 provide for guiding the record carrier towards the drum and away from it. A rotary magnetic head for recording and reproducing, for example, video information, is arranged inside the drum. In the direction of movement of the tape and after the guiding pin 9, there are arranged magnetic heads 10 and 11 for erasing and recording respectively acoustic and synchronizing signals, together with a driving spindle 13 which co-acts with a pressure roller 12 for the movement of the record carrier.

The drum 2 is surrounded and spaced from an annular envelope 14 which is integral with the cover plate 3. The cover plate has a cylindrical part 16 surrounding the drum and pointing towards the free end 15 thereof, the free end 17 of the cylindrical part 16 having a U-shaped, likewise cylindrical extension 18 which extends to the guide elements 7 arranged on the periphery of the drum on the side of the path of the record carrier which is adjacent the chassis of the apparatus. The ends 19 of the guide elements 7 thus extend at least as far as the inner surface 20 of the envelope 14, forming a closure for the space 21 between the envelope and the drum. It is not necessary for the extension 18 and the guide elements 7 to contact directly and they may be spaced apart a certain distance, as may be desirable for manufacturing tolerances.

The envelope 14 is also provided with a slot 22 which extends substantially in the direction of the axis of the drum and through which the record carrier can be led towards or away from the drum.

To position the record carrier around the drum, the carrier is formed into a loop and then introduced into the space 21 between drum and envelope and through the slot 22. The record carrier will lie on the guide element 7, thus automatically occupying the prescribed position for winding around the drum. As a matter of fact, it is not absolutely necessary for the record carrier to be formed into a loop prior to insertion; it may, if a free end of same is available, be caused to slide continuously in space 21 following the helical path. The simplicity of this operation has thus been made clear. The record carrier cannot leave the prescribed position, even when the apparatus has been switched off and the record carrier slackens or is intentionally loosened.

Figure 3:
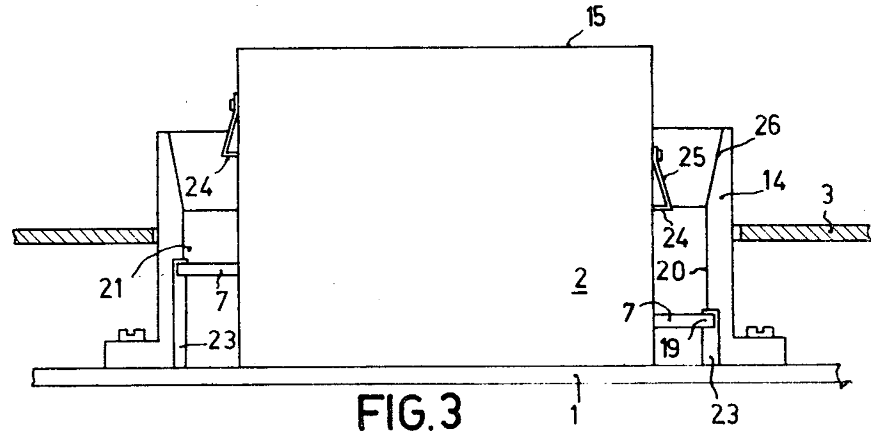
FIGURE 3 is a part sectional view.
Figure 4:
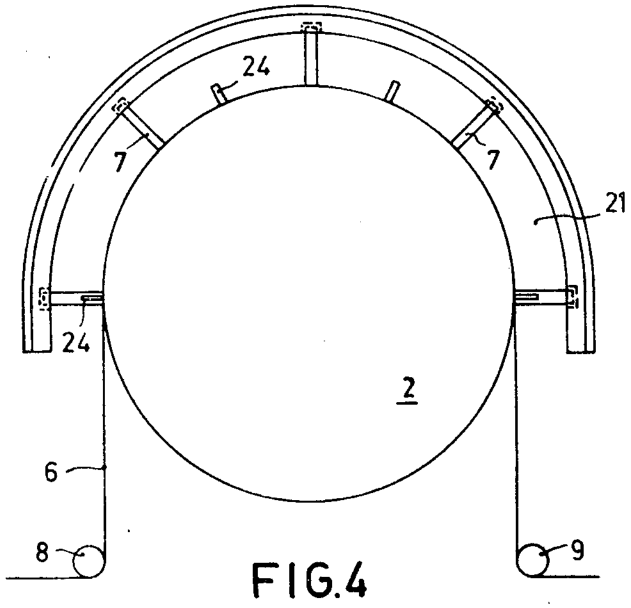
FIGURE 4 is a plan view of a drum device in which the record carrier is laid around the drum through 180° C. and is guided on both sides of its path.

The embodiment shown in FIGURES 3 and 4, includes an envelope 14 which is formed as an individual part and fitted on the chassis 1 of the apparatus. The record carrier 6 is guided via guiding pins 8 and 9 towards and away from the drum through the slot in the envelope, which in this example extends through 180°. The envelope now has a semi-circular cross-sectional shape.

The record carrier is guided over the periphery of the drum on each side of its path by means of guide elements. The guide elements which are arranged at the corresponding points on the periphery of the drum on the side of the path of the record carrier adjacent the chassis of the apparatus are formed by pins. The ends 19 of the pins 7 extend at least as far as the inner surface 20 of the envelope 14 and, the envelope has a slot 23 associated with each pin, into which the relevant end of the pin extends. The space 21 between drum and envelope is thus closed towards the chassis 1 of the apparatus. The guide elements which are arranged on the side of the path of the record carrier which is more remote from the chassis of the apparatus are formed by hook-shaped pins 24 fitted on the periphery of the drum. The pins 24 do not extend as far as the inner surface 20 of the envelope and each have, on their side remote from the path of the record carrier, an oblique slide surface 25 which points towards the free end 15 of the drum. These slide surfaces cause the record carrier, when introduced into the space 21, to slide with security over the pins 24. On its side remote from the chassis of the apparatus, the envelope has the shape of a funnel due to a bevelled side 26 of its inner surface 20, thus facilitating the introduction of the record carrier into the space 21.

The record carrier is simply laid around the drum by lowering a semicircular loop of the record carrier into the space 21.

As a matter of fact, numerous variants of the abovementioned embodiments are possible without passing beyond the scope of the invention. This especially with regard to the design of the envelope itself and its co-action with the guide elements which are arranged on the periphery of the drum on the side of the path of the record carrier which is adjacent the chassis of the apparatus.

What is claimed is:

1. A helical guide device for a recording and playback apparatus comprising a chassis, a drum mounted on the chassis, an annular envelope spaced from and in a surrounding relationship with the drum, a plurality of guide elements projecting from the periphery of the drum and extending at least to the surface of the envelope confronting the drum, said guide elements and envelope providing support for a record carrier helically positioned around the periphery of the drum; the drum and the envelope further define at least one slot therebetween for the passage of the record carrier onto and away from the drum.

2. The device as claimed in claim 1 further comprising a cover plate mounted on the chassis, said cover plate forming the envelope surrounding the drum.

3. The device claimed in claim 1 wherein the envelope is a separate cylindrical element mounted on the chassis, the edge of the envelope remote from the chassis being beveled to form a funnel-shaped slot and to provide a passageway for introducing the record carrier onto and away from the drum.

4. The device as claimed in claim 3 further comprising a plurality of pins projecting from the periphery of the drum and extending a distance less than the guide elements and spaced on the drum laterally from the guide elements so as to support the record carrier therebetween.

5. The device as claimed in claim 4 further comprising an oblique slide surface between the periphery of the drum and the end of the pin positioned on the side of the pin remote from the guide element, said slide surface permitting the passage of the record carrier over the pin during introduction of the record carrier onto the drum.

References Cited

UNITED STATES PATENTS

| | | | |
|---|---|---|---|
| 3,123,272 | 3/1964 | Pollaschek | 226—197 |
| 3,363,065 | 1/1968 | Tanigawa | 179—100.2 |
| 3,420,424 | 1/1969 | Barbeau | 226—196 X |

RICHARD A. SCHACHER, Primary Examiner